(12) United States Patent
Feith et al.

(10) Patent No.: US 12,134,299 B2
(45) Date of Patent: Nov. 5, 2024

(54) METHOD FOR MOUNTING A SEALING DEVICE BETWEEN A HOUSING OF AN AIR-CONDITIONING INSTALLATION AND A PARTITION WALL PRESENT IN OR ON THE VEHICLE INTERIOR OF A MOTOR VEHICLE

(71) Applicant: MAHLE International GmbH, Stuttgart (DE)

(72) Inventors: Thomas Feith, Pforzheim (DE); Michael Sickelmann, Kornwestheim (DE); Robin Hederer, Birstein (DE); Ronny Schreiber, Bad Orb (DE)

(73) Assignee: Mahle International GmbH, Stuttgart (DE)

( * ) Notice: Subject to any disclaimer, the term of this patent is extended or adjusted under 35 U.S.C. 154(b) by 0 days.

(21) Appl. No.: 17/541,113

(22) Filed: Dec. 2, 2021

(65) Prior Publication Data
US 2022/0194168 A1   Jun. 23, 2022

(30) Foreign Application Priority Data
Dec. 2, 2020   (DE) .................... 10 2020 215 220.9

(51) Int. Cl.
*B60H 1/00*   (2006.01)
*F16J 15/10*  (2006.01)

(52) U.S. Cl.
CPC ........ *B60H 1/00514* (2013.01); *F16J 15/104* (2013.01); *B60H 2001/00635* (2013.01)

(58) Field of Classification Search
CPC ............... F16J 15/104; B60H 1/00514; B60H 2001/00635
See application file for complete search history.

(56) References Cited

U.S. PATENT DOCUMENTS 5,853,323 A * 12/1998 Beck .................. B60H 1/00521
                                                                137/454.2
9,103,469 B2   8/2015 Grieb et al.
(Continued)

FOREIGN PATENT DOCUMENTS

CN    103644412 A    3/2014
DE    602005002825 T2   7/2008
(Continued)

OTHER PUBLICATIONS

Chinese Office Action dated Jan. 26, 2024, issued in Chinese counterpart application No. 202111451700.9, in English.

*Primary Examiner* — Eugene G Byrd
(74) *Attorney, Agent, or Firm* — Ewers IP Law PLLC; Falk Ewers

(57) ABSTRACT

A method for mounting a sealing device between a housing of an air-conditioning installation and a partition wall present in the motor vehicle, includes the following measures (a) arranging the housing and the partition wall relative to one another so that a housing aperture present in the housing and a wall aperture present in the partition wall are positioned adjacently to one another, (b) arranging a sealing device having a frame-shaped sealing body formed as profile part, which in profile is formed substantially V-shaped with a first and second leg, between the two apertures, (c) reducing a distance between the two apertures by moving the housing towards the partition wall until a transition connecting the legs with one another folds over towards the wall aperture or away from the same.

19 Claims, 1 Drawing Sheet

(56) References Cited

U.S. PATENT DOCUMENTS

| | | | |
|---|---|---|---|
| 11,028,851 B2* | 6/2021 | Diekmann | F04D 25/0606 |
| 11,156,222 B2* | 10/2021 | Diekmann | H02K 5/225 |
| 2001/0054799 A1* | 12/2001 | Mccomb | A47K 3/008 |
| | | | 277/590 |
| 2005/0242571 A1* | 11/2005 | Houghton | F16L 17/035 |
| | | | 277/626 |
| 2007/0144208 A1* | 6/2007 | Araki | F25D 23/006 |
| | | | 62/527 |
| 2009/0102139 A1* | 4/2009 | Noro | B60R 13/0846 |
| | | | 277/628 |
| 2012/0175848 A1* | 7/2012 | Leonard | F16J 15/104 |
| | | | 277/624 |
| 2014/0042713 A1 | 2/2014 | Grieb et al. | |
| 2015/0021858 A1 | 1/2015 | Richter et al. | |
| 2015/0175092 A1* | 6/2015 | Thome | B60J 10/35 |
| | | | 277/637 |
| 2016/0115808 A1* | 4/2016 | Davis | F16J 15/104 |
| | | | 277/592 |
| 2019/0107199 A1* | 4/2019 | Dore | F16J 15/025 |

FOREIGN PATENT DOCUMENTS

| | | | |
|---|---|---|---|
| DE | 102009004686 A1 * | 7/2010 | B60R 13/083 |
| DE | 102011004560 A1 | 8/2012 | |
| DE | 102013003027 A1 * | 3/2014 | B60H 1/00535 |
| DE | 102013107601 A1 | 1/2015 | |
| EP | 1700723 A1 | 9/2006 | |
| FR | 2623756 A1 | 6/1989 | |

* cited by examiner

METHOD FOR MOUNTING A SEALING DEVICE BETWEEN A HOUSING OF AN AIR-CONDITIONING INSTALLATION AND A PARTITION WALL PRESENT IN OR ON THE VEHICLE INTERIOR OF A MOTOR VEHICLE

CROSS REFERENCE TO RELATED APPLICATIONS

This application claims priority to German patent application DE 10 2020 215 220.9, filed Dec. 2, 2020, the entire content of which is incorporated herein by reference.

TECHNICAL FIELD

The disclosure relates to a method for mounting a sealing device between a housing of an air-conditioning installation and a partition wall present in or on the vehicle interior of a motor vehicle. Furthermore, the disclosure relates to a sealing device and to a motor vehicle having such a sealing device.

BACKGROUND

Air-conditioning devices for air-conditioning the vehicle interior of a motor vehicle are typically mounted on a partition wall provided in a motor vehicle, which separates the vehicle interior of the motor vehicle from the engine compartment or from the outer surroundings of the motor vehicle. Such a partition wall can be a bulkhead.

Lines, for example fluid lines needed for the air-conditioning device for conducting a refrigerant, but also electrical lines are typically connected to the air-conditioning device from the vehicle interior. Typically, a passage opening aperture is therefore formed in the said partition wall, which, for the said lines, forms a feedthrough to the air-conditioning device.

Such a feedthrough has to be formed so as to be fluid-tight in order to prevent fluid—for example in the form of moisture—entering from the engine compartment or the space in front of the partition wall or from the outside and to prevent moisture or water entering the vehicle interior. Typically, the feedthrough aperture of the partition wall is therefore sealed using a suitable seal between air-conditioning device and partition wall.

However, the typically technically complicated mounting of the seal between the housing of the air-conditioning device and the partition wall in the region of the feedthrough proves to be disadvantageous during such a procedure.

SUMMARY

It is therefore an object of the present disclosure to provide an improved method for mounting a sealing device between an air-conditioning device—in the following also referred to as "air-conditioning installation"—and the said partition wall, with which the sealing device can be particularly easily mounted and high sealing requirements are nevertheless fulfilled.

It is a further object of the present disclosure to provide an improved embodiment for such a sealing device, which can be used in particular for carrying out the improved mounting method.

These objects are achieved by a method for mounting a sealing device between a housing of an air-conditioning installation and a partition wall present in the motor vehicle and a sealing device for the fluid-tight sealing of a fluid connection between an air-conditioning installation and a partition wall and a motor vehicle having a vehicle interior, which is delimited by a partition wall or in which a partition wall is arranged as described herein.

Accordingly, a general idea of the disclosure is to form a frame-like seal—in the following referred to as "sealing device"—with a typically elastically deformable frame-shaped sealing body as closed profile part with, in profile, a V-shaped geometry and to arrange the same between a housing aperture provided in the housing of the air-conditioning installation and a partition wall aperture—this can be a bulkhead aperture when the partition wall is a bulkhead—provided in the partition wall—this can be a bulkhead—so that upon the subsequent reduction of the distance between the housing and the partition wall a part of the V-shaped sealing body, which forms the transition between the two V-legs of the sealing body and with a contact portion lies against the partition wall, folds over towards the aperture provided in the partition wall.

"Frame-shaped" is to mean here that the sealing body is not formed open but without ends, i.e., closed. The term "frame-shaped" thus includes in particular sealing bodies having a round, circular, ring-shaped as well as circular ring-shaped geometries. The term "frame-shaped" additionally includes in particular sealing bodies having the geometry of a rectangle, also with rounded corners.

Experimental investigations have shown that the sealing device, following such a folding-over, has better sealing properties. Thus, a fluid connection between the two apertures which provides a very good seal relative to the outer surroundings is created with the sealing body aperture enclosed by the frame-shaped sealing body. Such a fluid connection forms the desired fluid-tight feedthrough for lines from the side of the partition wall facing away from the air-conditioning installation—typically a vehicle interior—to the air-conditioning device itself.

Since it is not necessary with the procedure proposed here to "pull" the sealing device through the wall aperture provided in the partition wall, the mounting effort during the mounting of the sealing device between the air-conditioning device and the partition wall can be substantially reduced.

As a result, a method is created with which a fluid connection between the apertures provided in the housing of the air-conditioning device and in the partition wall can be easily sealed with very good sealing properties.

The method for mounting a sealing device between the housing of an air-conditioning installation and a partition wall present in or on the vehicle interior of a motor vehicle according to the disclosure includes the following three measures a), b) and c).

According to a first measure a) the housing and the partition wall are arranged relative to one another so that a housing aperture present in the housing and a wall aperture present in the partition wall are positioned adjacent to and spaced apart from one another. Practically, the two apertures are aligned with one another.

According to a further, second measure b), a sealing device, having a substantially frame-shaped sealing body formed with a closed profile part, which is formed substantially V-shaped in profile with a first and second leg, is arranged between the two apertures.

The arrangement of the sealing body takes place in such a manner that a sealing body aperture, enclosed by the sealing body formed frame-shaped, fluidically communicates with the two apertures so that the two apertures—i.e., wall aperture and housing aperture—fluidically communicate with one another via the sealing body aperture of the sealing body. In this way, a fluid connection between the housing of the air-conditioning installation and the side of the partition wall facing away from the sealing device—for example a vehicle interior of the vehicle, which is separated from the engine compartment with the partition wall—is formed. Here, the two legs in profile of the sealing body practically merge in a common transition—typically at an acute angle, into one another.

The two legs are typically formed integrally on one another, i.e., formed material-uniformly and in one piece. Typically, the sealing material of the sealing body is elastically deformable, particularly typically an elastomer.

With the method according to the disclosure, the arrangement of the sealing device also takes place in such a manner that in profile of the sealing body the transition between the two legs of the sealing body lies against the partition wall with a contact portion and a first end portion of the first leg facing away from the transition lies against the housing. Practically, the measure a) is carried out prior in time to the measure b).

Following the carrying out of the two measures a) and b) orb) and a), a distance, according to a third measure c) between the two apertures is reduced by moving the housing of the air-conditioning installation towards the partition wall at least so long until the transition of the sealing body folds over towards the wall aperture. During the course of the reduction of the distance and elastic deformation of the sealing body typically takes place as well.

According to an exemplary embodiment of the method, the sealing body is positioned prior to carrying out measure c), i.e., in particular during the course of measure b) between the housing and the partition wall so that the transition between the two legs of the sealing body is arranged substantially at a right angle to the partition wall. To this end, the sealing body is formed so that, following the carrying out of measure c), the transition is arranged at an acute angle towards the axial direction.

According to an advantageous further development, an extension portion molded in profile of the sealing body onto the V-shaped sealing body is inserted through the wall aperture in measure a). In this way, an additional splash guard for the fluid connection between housing aperture and wall aperture can be realized.

In an advantageous further development of the method, the first leg is formed curved in profile, wherein a curvature apex of the first leg faces the second leg. Here, the curvature radius of the first leg is reduced during the folding over of the transition in measure c). Advantageously, a force expenditure required for folding over the transition can thus be reduced.

According to a further exemplary embodiment of the method, the second leg has an S-shaped geometry in profile. Here, the S-shaped geometry of the second leg is stretched, in particular unfolded during the folding-over of the transition.

Practically, at least one thick or/and at least one thin point is/are present on the first and—alternatively or additionally—on the second leg. Here, a folding-over direction, in which the transition is folded over in measure c), is defined with the at least one thick or thin point. This ensures the tightness of the arrangement.

Furthermore, the disclosure relates to a sealing device for the fluid-tight sealing of a fluid connection between an air-conditioning installation and a partition wall, on which the air-conditioning installation is typically fastened or at least arranged. The sealing device can in particular be used for the method according to the disclosure explained above so that the advantages of the method according to the disclosure explained above also apply to the sealing device according to the disclosure. The sealing device according to the disclosure includes a frame-shaped sealing body formed as a profile part, which circumferentially encloses a sealing body aperture and which in profile has a substantially V-shaped geometry with a first and second leg, which in a transition, merge, preferentially at an acute angle, into one another.

According to an advantageous further development of the sealing device, the first leg of the sealing body in profile of the same comprises a first axial end portion facing away from the transition, which at an acute angle merges into an extension portion extending axially towards the transition. Such an extension portion can be inserted through the wall aperture provided in the partition wall, so that in this way an additional splash guard for the fluid connection between the two apertures, i.e., housing aperture and wall aperture is realized.

Particularly typically, the extension portion in the longitudinal section along the axial direction also extends substantially along the axial direction, preferentially in a straight line. This facilitates the "pulling" or "pushing" of the extension portion through the wall aperture. This is again accompanied by a further simplification of the mounting operation of the sealing device.

According to a further advantageous further development, the second leg, in the longitudinal section along the axial direction, comprises a second axial end portion facing away from the transition, from which, at an angle, preferentially at an acute angle, a hook-like extension projects. Such a hook-like extension can be used for additionally lying against the partition wall, as a result of which the achieved acoustic damping can be improved.

According to another advantageous further development, a recess is formed in the longitudinal section along the axial direction on the second axial end portion of the second leg. Such a recess can be used for receiving a projection provided on the housing, so that through the interaction of the projection with the recess a particularly good lateral fixing of the second leg and thus of the entire sealing body on the housing of the air-conditioning installation can be achieved.

According to a further exemplary embodiment, the sealing material of the sealing body is or includes an elastomer, in particular EPDM, or rubber, or butyl sealing material.

The disclosure also relates to a motor vehicle having a vehicle interior, which is delimited by a partition wall or in which a partition wall is arranged, wherein in the partition wall a wall aperture is arranged. Typically, the partition wall separates the vehicle interior from an engine compartment of the motor vehicle. Furthermore, the motor vehicle includes an air-conditioning installation which is arranged adjacently to the partition wall—typically in the engine compartment of the motor vehicle—and comprises a housing. The air-conditioning installation can be fastened with its housing to the partition wall. Furthermore, the motor vehicle includes a sealing device according to the disclosure introduced above, so that the advantages of the sealing device explained above also apply to the motor vehicle according to the disclosure. The sealing device is arranged—typically after the carrying out of the method according to the disclosure already explained above—between the wall aperture and the housing aperture so that it seals a fluid connection formed between the two apertures in a fluid-tight manner relative to the outer surroundings of the air-conditioning installation.

According to an exemplary embodiment of the motor vehicle, the elastically deformed transition portion of the sealing body supports itself with the contact portion on the partition wall, in particular on an enclosure portion of the partition wall enclosing the wall aperture of the partition wall. This measure is accompanied by improved sealing properties of the sealing device.

According to a further exemplary embodiment, the first axial end portion of the sealing body supports itself outside on the housing, in particular on an enclosure portion of the housing enclosing the housing aperture. This measure is also accompanied by improved sealing properties of the sealing device.

According to a further exemplary embodiment, the second axial end portion of the sealing body also supports itself outside on the housing, in particular on an enclosure portion of the housing enclosing the housing aperture. In this way, the fastening of the sealing device in the intermediate space between air-conditioning installation and partition wall can be mechanically stabilized.

According to an advantageous further development, a projection formed on the housing of the air-conditioning installation can engage in the recess formed on the sealing body for the improved lateral fixing of the sealing body on the air-conditioning installation. Practically, recess and projection are formed complementarily to one another for this purpose. In particular, the projection can be formed as a ring-shaped web and the recess as a ring-shaped groove.

According to a further advantageous further development, a thermal and/or thermal insulation can be arranged on the partition wall, on which the hook-like extension supports itself.

Particularly typically, the extension portion can engage through the wall aperture. In this way, the already mentioned splash guard can be realized.

Further important features and advantages of the disclosure are obtained from the drawings and from the associated figure description by way of the drawings.

It is to be understood that the features mentioned above and still to be explained in the following cannot only be used in the respective combination stated, but also in other combinations or by themselves without leaving the scope of the present disclosure.

Exemplary embodiments of the disclosure are shown in the drawings and are explained in more detail in the following description, wherein same reference numbers relate to same or similar or functionally same components.

BRIEF DESCRIPTION OF THE DRAWINGS

The disclosure will now be described with reference to the drawings wherein.

DESCRIPTION OF EXEMPLARY EMBODIMENTS

Figure 1:
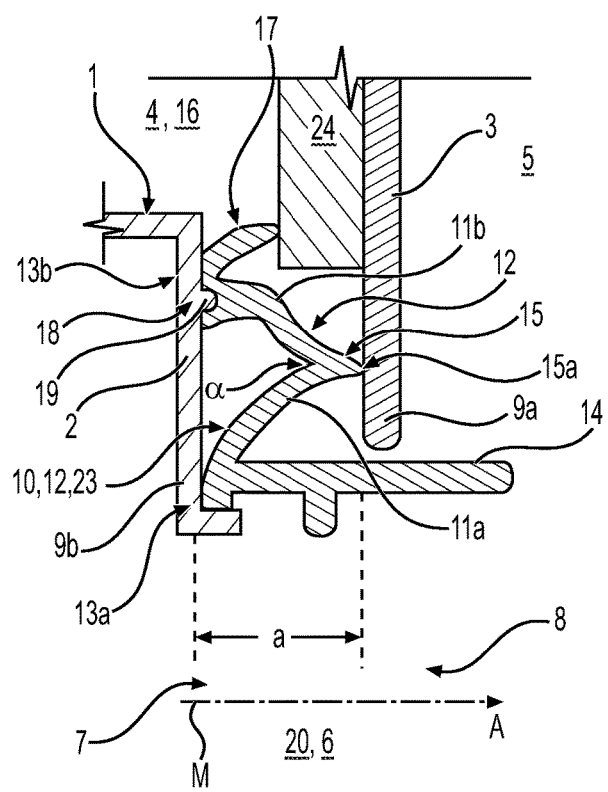
FIG. 1 shows an arrangement of an air-conditioning installation, sealing device and partition wall prior to carrying out measure c)
Figure 1:
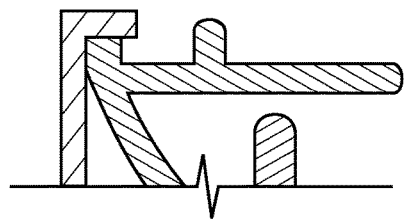

FIG. 1 shows in a longitudinal section along an axial direction A an air-conditioning installation 1 having a housing 2 and a partition wall 3, which separates an engine compartment 4 from a vehicle interior 5 of a motor vehicle. The partition wall 3 can be a bulkhead. According to FIG. 1, the air-conditioning installation 1 is arranged in the engine compartment 4. The housing 2 of the air-conditioning installation 1 can be fastened to the partition wall 3 in a suitable manner (not shown).

Furthermore, FIG. 1 shows a sealing device 10 arranged between the air-conditioning installation 1 and the partition wall 3. The sealing device 10 is arranged between the housing 2 and partition wall 3, namely between a housing aperture 7 present in the housing 2 and a wall aperture 8 present in the partition wall 3.

The sealing device 10 serves for the fluid-tight sealing of a fluid connection 6 between the housing aperture 7 and the wall aperture 8.

In the longitudinal section along the axial direction A shown in the figures, both apertures 7, 8 are aligned with one another. Independently thereof, the two apertures 7, 8 can each have a frame-like geometrical shape in a respective plan view along the axial direction A. The axial direction A then extends along a common center longitudinal axis M of the two apertures 7, 8.

The sealing device 10 includes a frame-shaped sealing body 12 formed as a closed profile part 23, which circumferentially encloses a sealing body aperture 24. In the figures, the sealing body 12 is shown in profile. Accordingly, the sealing body 12 in profile has a substantially V-shaped geometry with a first and second leg 11a, 11b which in a transition 15 merge into one another at an acute angle α.

The housing 2 and the partition wall 3 are connected to one another via the sealing device 10, so that a frame-shaped sealing body 12 formed as profile part 23 circumferentially encloses a sealing body aperture 20 which forms the fluid connection 6, which with respect to the outer surroundings 16 is fluidically sealed off. Thus, various lines (not shown)—for example fluid lines for conducting a refrigerant, which are part of a refrigeration or heating circuit, or electrical lines, can be conducted from the vehicle interior 5 to the air-conditioning installation 1. Because of the sealing achieved with the sealing device 10, damage to the lines arranged in the fluid connection 6, i.e., in the sealing body aperture 20, for example by moisture out of the outer surroundings 16 or the engine compartment 4 is avoided.

The sealing material of the sealing body 12 is elastically deformable. For this purpose, an elastomer, for example EPDM or rubber or butyl sealing material is possible.

In profile, the first leg 11a comprises a first axial end portion 13a facing away from the transition 15, which, at an acute angle, merges into an extension portion 14 axially extending towards the transition 15. In the longitudinal section shown in the figures, the extension portion 14 extends in a straight line along the axial direction A.

The elastically deformed transition 15 of the sealing body 12 supports itself with the contact portion 15a on an enclosure portion 9 an enclosing the wall aperture 8 of the partition wall 3. The first axial end portion 13a of the sealing body 12 supports itself outside on the housing 2, in particular on an enclosure portion 9b of the housing 2 enclosing the housing aperture 7. Likewise, the second axial end portion 13b of the sealing body 10 also supports itself—at a radially greater distance from the center longitudinal axis M of the two apertures 7, 8 than the first axial end portion 11a— outside on the housing 2 on the enclosure portion 9b.

As is additionally shown in FIG. 1, the second leg 11b in the shown profile comprises a second axial end portion 13b facing away from the transition 15, from which at an angle, preferentially as shown in FIG. 1 at an acute angle, a hook-like extension 17 projects. Furthermore, a recess 18 is formed in profile of the sealing body 12 on the second axial end portion 13b of the second leg 11b.

In the shown longitudinal section, the second leg 11b comprises a second axial end portion 13b facing away from the transition, from which in the shown longitudinal section, again at an acute angle, a hook-like extension 17 projects. The hook-like extension 17 is integrally molded out of the second end portion 13b.

Figure 2:
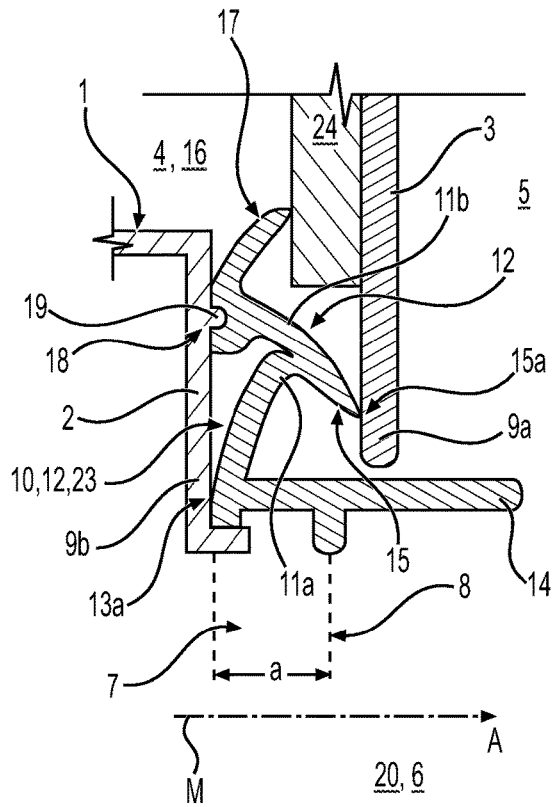
FIG. 2 shows an arrangement of an air-conditioning installation, sealing device and partition wall after carrying out measure c).
Figure 2:
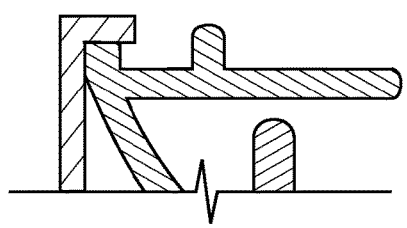

As is evident, furthermore from FIGS. 1 and 2, a projection 19 formed on the housing 2 of the air-conditioning installation 1 engages into the recess 18 formed on the sealing body for laterally fixing the sealing body 10. Apart from this, facing the air-conditioning installation 1, an acoustic insulation 24 can be arranged on the partition wall 3, on which the hook-like extension 17 supports itself.

The method according to the disclosure is explained in the following by way of the FIGS. 1 and 2.

According to FIG. 1, the housing 2 and the partition wall 3 are arranged relative to one another in a first measure a) so that the housing aperture 7 present in the housing 2 and the wall aperture 8 present in the partition wall 3 are positioned adjacent to and spaced apart from one another. As shown in FIG. 1, the two apertures 7, 8 are aligned with one another along the axial direction A.

Furthermore, the sealing body 12 with its two legs 11a, 11b and the transition 15 is arranged according to a second measure b) between the housing aperture 7 and the wall aperture 8. As already explained, the arranging of the sealing device 12 between the housing 2 and the partition wall 3 takes place in such a manner that in the shown longitudinal section along the axial direction A the transition 15 between the two legs 11a, 11b lies with a contact portion 15a against the partition wall 3. The first end portion 13a of the first leg 11a facing away from the transition 15 lies against the housing 2.

The representation of FIG. 1 additionally illustrates that the sealing body 12 during the course of the measure b) and thus prior to carrying out measure c) is positioned between the housing 2 and the partition wall 3 so that in the shown longitudinal section the transition 15, with the contact portion 15a lying against the partition wall 3, is arranged substantially at a right angle to the partition wall 3.

During the course of measure b), the extension portion 14 of the sealing body 12 can be additionally inserted through the wall aperture 7. The scenario illustrated above is shown in the representation of FIG. 1.

According to a third measure c), an axial distance a measured along the axial direction A between the two apertures 7, 8 is reduced by moving the housing 2 towards the partition wall 3 at least until the transition 15, lying against the partition wall 3, is folded over towards the wall aperture 8. In the process, the contact portion 15a remains in mechanical contact with the partition wall 3. During the reduction of the distance a according to measure c), the contact portion 15a of the transition 15 slides, subject to elastic deformation of the transition 15 measure on the partition wall 3 towards the wall aperture 8.

FIG. 2 shows the arrangement shown in FIG. 1 following the carrying out of the measure c). As is noticeable in FIG. 2, the transition 15, after the carrying out of measure c), is arranged at an acute angle towards the axial direction a. Instead of a folding-over of the transition 15 towards the wall aperture 8—as explained above and shown in FIG. 2—it is also possible alternatively to this that the transition 15 folds over away from the wall aperture 8 (not shown).

In order to bring about the folding-over of the transition 15 in the desired folding-over direction, in particular in the case that the sealing device 12 is realized with a homogeneous material, the first leg 11a in profile is formed for example curved, wherein a curvature apex of the first leg 11a faces the second leg 11b. A curvature radius of the first leg is reduced in size during the folding-over. The second leg 11b, for bringing about the folding-over of the transition 15 is realized for example with an S-profile, which during the folding-over of the transition 15 is unfolded. In order to prevent that the transition 15 folds over radially to the outside—instead of radially to the inside as desired—thick and thin points in profile can each be present on the first and on the second leg 11a, 11b. The first leg 11a tends to have a smaller thickness in profile at a thinnest point than the second leg 11b at its thinnest point.

It is understood that the foregoing description is that of the exemplary embodiments of the disclosure and that various changes and modifications may be made thereto without departing from the spirit and scope of the disclosure as defined in the appended claims.

What is claimed is:

1. A method for mounting a sealing device between a housing of an air-conditioning installation and a partition wall present in a motor vehicle, the method comprising:
   (a) arranging the housing and the partition wall relative to one another so that a housing aperture present in the housing and a wall aperture present in the partition wall are positioned adjacent to one another;
   (b) arranging a sealing device having a frame-shaped sealing body formed as a profile part, which in profile is formed substantially V-shaped with a first and second leg, between the two apertures in such a manner that:
      the sealing body aperture circumferentially enclosed by the frame-shaped sealing body fluidically communicates with the two apertures in such a manner that
      in profile a transition between the two legs of the sealing body lies, with a contact portion of the transition against the partition wall and a first end portion of the first leg facing away from the transition lies against the housing; and
   (c) reducing a distance between the two apertures by moving the housing towards the partition wall at least until the transition folds over towards the wall aperture or away from the wall aperture.

2. The method according to claim 1, wherein:
   the sealing body prior to carrying out measure (c) is positioned between the housing and the partition wall so that the transition is arranged substantially at a right angle to the partition wall, and
   the sealing body is configured such that in a longitudinal section along an axial direction, which points from the housing aperture to the wall aperture, after the carrying out of measure (c), the transition is arranged at an acute angle towards the axial direction.

3. The method according to claim 1, wherein in measure (a) an extension portion molded in profile on to the V-shaped sealing body is also inserted through the wall aperture as well.

4. The method according to claim 1, wherein:
   the first leg is formed curved in profile,
   a curvature apex of the first leg faces the second leg, and
   the curvature radius of the first leg is reduced in size during the folding-over of the transition in measure (c).

5. The method according to claim 1, wherein:
   the second leg in profile has an S-shaped geometry, and
   the S-shaped geometry of the second leg during the folding-over of the transition is stretched, in particular unfolded.

6. The method according to claim 1, wherein:
on the first and/or on the second leg at least one thick point and/or at least one thin point are/is present, and
with the at least one thick point or thin point a folding-over direction, in which the transition is folded over in measure (c), is defined.

7. A sealing device for the fluid-tight sealing of a fluid connection between an air-conditioning installation and a partition wall, in particular subject to carrying out the method according to claim 1, the sealing device comprising:
a frame-shaped sealing body formed as profile part, which circumferentially encloses a sealing body aperture and which in profile has a substantially V-shaped geometry with a first and second leg, which in a transition, merge into one another typically at an acute angle.

8. The sealing device according to claim 7, wherein in profile the first leg comprises a first axial end portion facing away from the transition, which at an acute angle merges into an extension portion extending towards the transition.

9. The sealing device according to claim 8, wherein the extension portion in profile extends in a straight line.

10. The sealing device according to claim 7, wherein the second leg in profile comprises a second axial end portion facing away from the transition, from which at an angle, typically at an acute angle, a hook-like extension projects.

11. The sealing device according to claim 7, wherein in profile on the second axial end portion of the second leg a recess is formed.

12. The sealing device according to claim 7, wherein the material of the sealing body includes or is an elastomer, in particular EPDM.

13. A motor vehicle having a vehicle interior, which is delimited by a partition wall or in which a partition wall is arranged, wherein in the partition wall a wall aperture is arranged, the motor vehicle comprising:
an air-conditioning installation arranged adjacently to the partition wall, which comprises a housing, in which a housing aperture is arranged; and
a sealing device according to claim 7 arranged between the wall aperture and the housing aperture such that it seals off a fluid connection formed between the two apertures by the sealing body aperture fluid-tight relative to the outer surroundings of the air-conditioning installation in a fluid-tight manner.

14. The motor vehicle according to claim 13, wherein the elastically deformed transition portion of the sealing body supports itself with the contact portion on the partition wall, in particular on an enclosure portion of the partition wall enclosing the wall aperture.

15. The motor vehicle according to claim 13, wherein the first axial end portion of the sealing body supports itself outside on the housing, in particular on an enclosure portion of the housing enclosing the housing aperture.

16. The motor vehicle according to claim 13, wherein the second axial end portion of the sealing body supports itself outside on the housing in particular on an enclosure portion of the housing enclosing the housing aperture.

17. The motor vehicle according to claim 13, wherein for the lateral fixing of the sealing body a projection formed on the housing of the air-conditioning installation engages in the recess formed on the sealing body.

18. The motor vehicle according to claim 13, wherein on the partition wall an acoustic and/or thermal insulation is arranged, on which the hook-like extension supports itself.

19. The motor vehicle according to claim 13, wherein the extension portion engages through the wall aperture.

* * * * *